Sept. 29, 1964
W. D. PRATT
3,150,786
PALLET LOADER
Filed Aug. 11, 1961
2 Sheets-Sheet 1
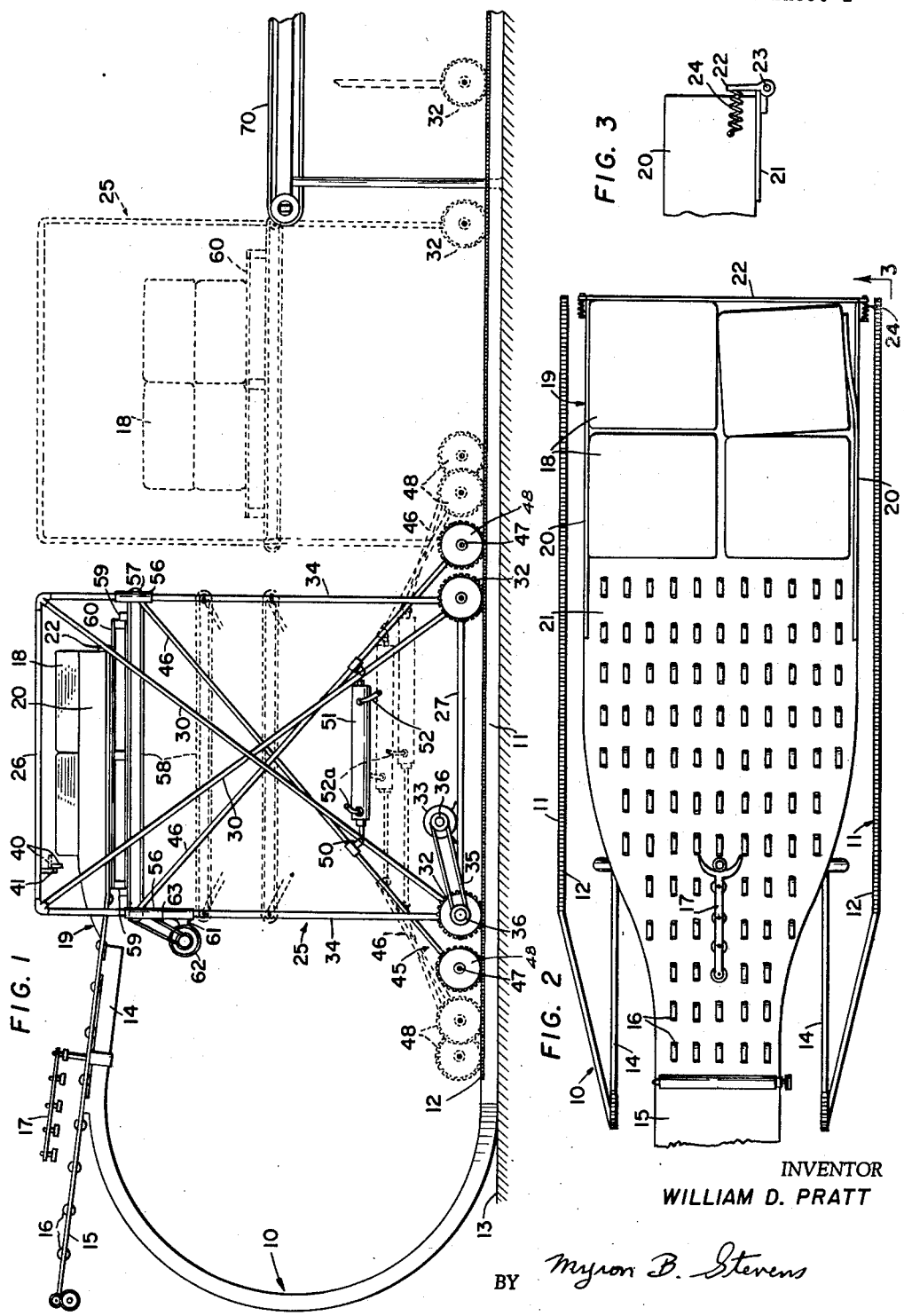
INVENTOR
WILLIAM D. PRATT
BY Myron B. Stevens
ATTORNEY Sept. 29, 1964

W. D. PRATT 3,150,786

PALLET LOADER

Filed Aug. 11, 1961

INVENTOR.
WILLIAM D. PRATT

BY Myron B. Stevens

ATTORNEY

United States Patent Office 3,150,786
Patented Sept. 29, 1964

3,150,786
PALLET LOADER
William D. Pratt, Pusan, Korea (% Office of the General Counsel, Patents Branch, Office of the Quartermaster General, 2nd and S Sts. SW., Washington 25, D.C.)
Filed Aug. 11, 1961, Ser. No. 135,693
7 Claims. (Cl. 214—6)
(Granted under Title 35, U.S. Code (1952), sec. 266)

The invention described herein, if patented, may be manufactured and used by or for the Government for governmental purposes, without the payment to me of any royalty thereon.

The invention relates to mechanical means for loading pallets with successive layers of cargo in the form of packaged goods and more specifically to that type of pallet loader wherein the pallet is initially located in an elevated position substantially flush with a platform holding a layer of cargo which is mechanically pushed unto the pallet, the latter being then lowered to locate the layer of cargo substantially flush with the platform to receive a second layer of cargo, the operation being continued until the pallet has received its full complement of layers of goods. Such devices are well known but have the disadvantage that they require heavy machinery which must be permanently installed whereby to limit its use to a single area of a warehouse or the like. Thus, for efficient use each warehouse would have to have a large number of these permanent installations which are extremely expensive. Obviously, such permanent installations could not be economically transported and set up in temporary supply dumps used by the military services.

With the foregoing in view, it is an object of the invention to provide an improved pallet loader.

A further object is to provide an improved pallet loader which is portable in nature so that it can be readily moved from place to place and quickly installed for use by unskilled personnel using hand tools.

A further object is to provide an improved pallet loader which includes a combined pallet carrier and pallet support together with means mounting the same for reciprocating movement relative to a fixed platform mounting successive layers of cargo, the pallet support being lowered after receipt of each layer and between reciprocations of the carrier.

Other objects and advantages reside in the particular structure of the invention, the structure of the several elements of the same, combinations and subcominations of such elements with each other, and/or with auxiliary equipment, and in the particular method or mode of operation, all of which will be readily apparent to those skilled in the art upon reference to the attached drawing which illustrates one species of the invention and to the following specification wherein the invention is described and claimed.

In the drawing:

FIGURE 1 is a side elevational view through the assembly;

FIGURE 2 is a top plan view of the loading platform parts being broken away;

FIGURE 3 is an enlarged fragmentary elevational view looking in the direction of the arrow 3 of FIGURE 2;

Figures 4, 5:
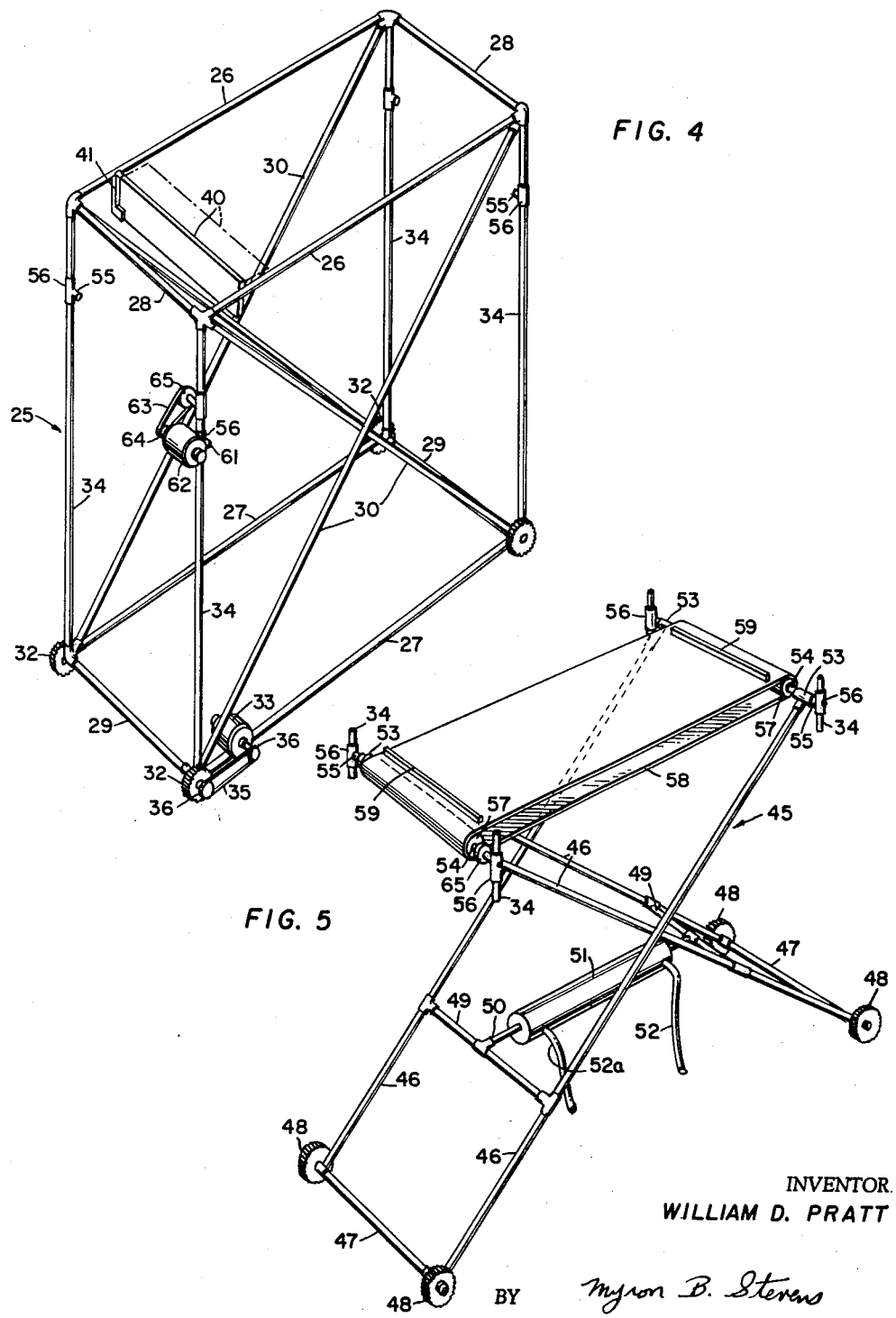
FIGURE 4 is a perspective view of the pallet carrier apart from the pallet holder parts of such holder being shown fragmentarily.
FIGURE 5 is a like view of the pallet holder, the pallet carrier being shown fragmentarily.

Referring specifically to the drawing wherein like reference characters designate like parts in all views, and referring at first to FIGURES 1 and 2, 10 designates generally a base member which includes laterally spaced twin track rails 11 having upper surfaces formed with rack teeth 12. The rails 11 may be temporarily or semi-permanently anchored to the floor or ground 13 by any suitable means, not shown. The rails 11 at one end are upwardly, inwardly and reversely extended to provide free ends 14 which overlie the rack-toothed rail portions below. Such free rail ends 14 support one end of any suitable conveyor 15 which may be a gravity type of conveyor having rollers or the like 16 which deliver articles 18 of cargo to a loading platform 19. A switch 17 of well known form may be utilized to direct alternate articles 18 to opposite sides of the platform 19 in a well known manner.

Platform 19 is provided with side walls 20 which are spaced apart substantially the width of a pallet whereby the articles 18 are automatically arranged on the floor 21 of the platform as they eventually will be on the pallet. The free end or forward end of the platform 19 is provided with a gate 22 best seen in FIGURE 3. Gate 22 extends across the free end of the floor 21 and is hinged thereto by any suitable hinge means 23 for movement from a vertical operative position to a substantially horizontal open position. Suitable spring means 24 normally hold the gate 22 in the closed position. However, gate 22 will yield and move to the open position as a layer of cargo articles 18 are forced thereagainst and off of the platform floor 21 as will appear later. Any suitable means, not shown, is provided to limit the feeding of cargo articles to the platform 19 to prevent piling up of articles beyond the needs of the device.

The pallet carrier is generally designated by 25 and is best seen in FIGURE 4. It may comprise upper and lower horizontal frame members 26 and 27 respectively, upper and lower cross frame members 28 and 29 respectively, upright corner frame members 34, and suitable cross braces 30, whereby to provide a generally rectangular open frame which has a width sufficient to straddle the platform 19. The lower cross frame members 29 may be journalled in the lower ends of the corner frame members 34 to provide axles on which are mounted spur gears 32 which meshingly engage the teeth 12 of the track rails 11. Any suitable means such as the electric motor 33 is mounted in any suitable manner on the carrier 25 as on one of the lower frame members 27. Motor 33 is operatively connected by any suitable belt or chain means 35 and pulleys or gear means 36, 36 to one of the axles 29 to provide means for driving the carrier 25 along the rails 11 in both directions. In this connection, it is to be understood that the motor 33 is a reversible one or that other means such as a reversing gear is provided for driving the carrier in both directions.

A scraper 40 extends between the two upper longitudinal frame members 26 near the cargo entering end of the carrier. Scraper 40 is hingedly mounted for forward and upward swinging movement from a vertical operative or scraping position shown in full lines in FIGURES 1 and 4 to an open or horizontal position shown in broken lines in FIGURES 1 and 4. Any suitable stop means 41 may be provided on one or both of the upper longitudinal frame members 26 to prevent rearward and upward movement of the scraper 40 from its operative position. It is apparent from the foregoing that the scraper 40 functions as a oneway gate in that it freely swings to the open position to permit a cargo article 18 to pass therethrough unto the platform 19 but prevents relative reverse movement of such articles.

The pallet holder is generally indicated by 45 and is best seen in FIGURE 5. It comprises two pairs of crossed legs 46 the lower ends of which are connected together by axles 47 the outer ends of which mount spur gears 48 which meshingly engage the teeth 12 of the track rails 11 for free movement therealong. Above the axles 47, the legs 46 are connected together by suitable cross braces 49. One cross brace 49 pivotally mounts the outer end of the piston rod 50 of a hydraulic cylinder 51 which, in turn, is pivotally connected to the other cross brace 49. Fluid under pressure is supplied to the cylinder 51 through hoses or the like 52, 52a from any suitable source of fluid under pressure, not shown. As fluid under pressure is admitted to the cylinder 51 through hose 52, hose 52a acts as an exhaust and the piston rod 50 will be forced outwardly whereby to spread apart the lower ends of legs 46 and spur gears 48. This has the effect of lowering the upper ends of the legs 46

The upper ends of the legs 46 are provided with transversely extending sleeves or journals 53 in which arbors 54 are freely rotatable. Arbors 54 have outer ends which are freely rotatable in suitable bearings 55 which are carried by vertical sleeves 56 which are freely slidable on the upright corner frame members 34 of the carrier 25. Rollers 57 are fixed on the arbors 54 for rotation therewith and to drive any suitable endless conveyor belt 58. The upper run of belt 58 preferably mounts two cleats or the like 59 which are spaced apart the length of a pallet 60, FIGURE 1. One vertical sleeve 56 is provided with an integral extension 61 on which is mounted a reversible electric motor or the like 62. A belt or chain drive 63 connects the motor pulley 64 with a pulley 65 which is fixed on the adjacent arbor 54 to drive the same and the conveyor belt 58 in a manner readily understood. Both motors 33 and 62 are connected to any suitable source of electric power, not shown, by suitable electric cords, not shown. From the foregoing, it is clear that operation of the hydraulic cylinder in one direction will lower the conveyor belt 58 and a pallet 60 seated thereon to any selected height within the limits of the cylinder 51 and piston rod 50.

In operation, the carrier 25, together with the support or holder 45 is placed to straddle the platform 19 with the pallet support 45 elevated so that a pallet 60 carried thereby is just below the floor 21 of the platform 19. Enough cargo articles 18 to form one layer on the pallet 60 are now permitted to flow unto the platform 19 past the scraper 40. Motor 33 is now operated in a direction to move the carrier 25 and support 45 from left to the right to the broken line position of FIGURE 1. This brings the scraper 40 into engagement with the back of the layer of articles 18 and scrapes them off of the floor 21 of the platform onto the pallet 60 as gate 22 first compacts the articles 18 and then yields to the open position. Motor 33 is now stopped either automatically or manually and cylinder 51 is energized in a direction to lower the conveyor 58 together with the pallet 60 and layer of articles 18 carried thereby until the top of such layer is just below the floor 21 of the platform 19. Cylinder 51 is then inactivated and motor 33 is operated in reverse to move the carrier 25 and support 45 back to their original locations beneath the platform 19. Meanwhile, sufficient articles 18 to form another layer have been admitted to the platform 19. The motor 33 and cylinder 51 are actuated as before and a second layer of articles of cargo are deposited atop the first layer and are lowered to a position just below floor 21 as before.

This cycle is repeated until the desired number of layers have been placed on the pallet 60. By that time, the conveyor 58 is substantially flush with a second conveyor 70, FIGURE 1. Operation of the motor 62 in one direction will drive conveyor belt 58 in a direction to transfer the loaded pallet 60 to the conveyor 70 which conveys away such loaded pallet. Another pallet 60 is now placed on conveyor 58 and the parts are returned to the starting positions. In this connection, it is understood that the cylinder 51 and piston 50 may be positively operated in a reverse direction by supplying fluid under pressure thereto through the second hose or the like 52a with hose 52 acting as an exhaust in a manner readily understood.

It is apparent from the foregoing, that the device is readily transportable for operation with portable conveyors or chutes, can be readily moved from one fixed chute or conveyor to another whereby one device can successively service a plurality of chutes; and that it is capable of automatic or semi-automatic operation. Likewise, it is clear that the device does not require more than a single operator.

Moreover, while there has been shown and described what is now thought to be the preferred embodiment of the invention, it should be understood that the same is susceptible of other forms and expressions. Consequently, the invention is not considered to be limited to the precise structures shown and described hereinabove but only as hereinafter claimed.

I claim:

1. A pallet loader comprising an elevated platform, means for supplying a layer of cargo to said platform, a pallet carrier, a pallet support, means mounting said support on said carrier for vertical movement relative thereto and to said platform, said carrier and support having a normal location wherein said carrier straddles said platform with said support disposed below said platform, said support having a first operative position wherein it supports a pallet immediately below said platform, a scraper, means mounting said scraper on said carrier above said platform rearwardly of said layer of cargo for unitary movement with said carrier, said platform having a front edge, a yieldable barrier, said barrier comprising a rigid gate, means hingedly mounting said gate on said front edge of said platform for swinging movement from a vertical barrier providing position to a horizontal open position, spring means normally holding said barrier in said vertical position, means for moving said carrier and support forwardly of said platform whereby said layer is first compacted against said yieldable barrier by said scraper and thereafter scraped off of said platform onto said pallet upon yielding of said barrier, means for lowering said support to a second operative position locating said layer on a plane immediately below said platform, means for returning said carrier and support to said normal location, and means for supplying a second layer of cargo to said platform forwardly of said scraper.

2. A portable pallet loader comprising a portable base including spaced and parallel horizontal rails, said rails including rear ends which are upwardly, inwardly and forwardly directed to provide an elevated support overlying said base, a platform atop said elevated support, means for supplying a layer of cargo to said platform, a pallet carrier including a pallet support, said carrier having an operative position straddling said platform, said pallet support having a first operative position wherein it locates a pallet carried thereby immediately below said platform, scraper means on said carrier above said platform and extending transversely across the same behind said layer of cargo, said scraper means being fixed to said carrier for movement therewith as a unit, rollable means for moving said carrier forwardly along said rails relative to said platform whereby to cause said scraper to scrape said layer of cargo off of said platform and onto said pallet, means for lowering said pallet support to a second operative position locating said layer of cargo on a plane immediately below said platform, means for returning said carrier to said operative position with said support, pallet and layer of cargo below said platform, and means for supplying a second layer of cargo to said platform in front of said scraper.

3. A pallet loader comprising an elevated platform, means for supplying a layer of cargo to said platform, a pallet carrier, a pallet support, means mounting said support on said carrier for vertical movement relative thereto and to said platform, said carrier having a normal location astraddle said platform with said support below said platform, a pallet atop said support, said support having a first operative position wherein said pallet is supported immediately below said platform, said carrier including top portions projecting above said platform on opposite sides thereof, a scraper, means mounting said scraper between said top portions transversely of said platform for forward and upward swinging movement from a depending scraping position to a raised open position permitting the passage of a layer of cargo therebelow, stop means preventing rearward movement of said scraper from scraping position, a yieldable barrier extending across said platform forwardly of said layer, said platform having an elongated base extending forwardly thereof in downwardly spaced relation thereto, rails on said base extending longitudinally of the same, rack teeth on said rails, cog wheels on said carrier in meshing relation with said rack teeth, motor means for driving at least one of said cog wheels and comprising means for moving said carrier and support forwardly of said platform whereby said layer is first compacted against said barrier by said scraper and thereafter scraped off of said platform onto said pallet upon yielding of said barrier, said support having two pairs of crossed legs having upper ends pivoted to said support, said legs having lower ends, cog wheels journaled on said lower ends in meshing engagement with said rack teeth of said rails, hydraulic means for spreading apart said lower ends of said legs to lower said support to a second operative position wherein said layer is disposed on a plane immediately below said platform, said motor means being operative to return said carrier to said normal location, and means for supplying a second layer of cargo to said platform forwardly of said scraper.

4. A pallet loader comprising an elevated platform, means for supplying a layer of cargo to said platform, a pallet carrier, a pallet support, means mounting said support on said carrier for vertical movement relative thereto, means mounting said support and carrier for horizontal reciprocating movement relative to said platform, said support and carrier having a normal location wherein said carrier straddles said platform with said support below the same, a pallet carried on said support atop the same, said support having portions extending above said platform on opposite sides thereof, a scraper connecting said portions across said platform, a yieldable barrier extending across said platform forwardly of said scraper, said support having a first operative position wherein said pallet is disposed immediately below said platform, motor means for moving said support and carrier forwardly of said platform whereby said scraper first compacts said layer of cargo against said barrier and thereafter scrapes said cargo off of said platform and onto said pallet upon yielding of said barrier, said support including two pairs of crossed legs, said legs having upper ends pivoted to said support, said legs having lower ends having wheels journaled thereon, means for spreading said lower ends of said legs to lower said pallet to a second operative position wherein said layer is disposed on a plane immediately below said platform, and said motor being operative to return said support and carrier to its normal location.

5. A pallet loader comprising an elevated platform, means for supplying a layer of cargo to said platform, a pallet carrier, a pallet support, means mounting said support on said carrier for vertical movement relative thereto, means mounting said support and carrier for horizontal reciprocating movement relative to said platform, said support and carrier having a normal location wherein said carrier straddles said platform with said support below said platform, a pallet carried by said support atop the same, a cargo scraper carried by said carrier above said platform behind said layer of cargo, said support having a first operative position wherein said pallet is disposed immediately below said platform, motor means for moving said carrier and support forwardly of said platform whereby said scraper scrapes said layer of cargo off of said platform and onto said pallet, said support including two pairs of crossed legs, said legs having upper ends pivoted to said support, said legs having lower ends having wheels journaled thereon, means for spreading apart said lower ends of said legs so as to lower said pallet to a second operative position wherein said layer of cargo is disposed on a plane immediately below said platform, said motor means being operative to return said carrier and support to said normal location, and means for supplying a second layer of cargo to said platform forwardly of said scraper.

6. A portable pallet loader comprising a portable base including spaced and parallel horizontal rails, said rails having rack teeth formed thereon, said rails including rear ends which are upwardly, inwardly and forwardly directed to provide an elevated support overlying said base, a platform atop said support, means supplying a layer of cargo to said platform, a pallet carrier including a pallet support, said carrier having an operative location straddling said platform, said pallet support having a first operative position wherein it locates a pallet carried atop the same immediately below said platform, scraper means on said carrier extending transversely of said platform above the same, cog wheels on said carrier in meshing engagement with said rack teeth of said rails, motor means for driving at least one of said cog wheels so as to move said carrier and pallet support forwardly of said platform whereby said layer of cargo is scraped off of said platform and onto said pallet, said pallet support having two pairs of crossed legs pivoted thereto, said legs having lower ends having cog wheels journaled thereon and in meshing engagement with said rack teeth of said rails, means for spreading apart said lower ends of said legs so as to lower said pallet support to a second operative position wherein said layer of cargo is disposed on a plane immediately below said platform, said motor means being operative to return said carrier and pallet support to said operative location, and means for supplying a second layer of cargo to said platform forwardly of said scraper means.

7. A portable pallet loader comprising a portable base including spaced and parallel horizontal rails, said rails including rear ends which are upwardly and forwardly directed, an elevated platform carried by said rear ends of said rails, means for supplying a layer of cargo to said platform, a pallet carrier including a pallet support, said carrier having an operative location straddling said platform, means mounting said support on said carrier for vertical movement relative thereto, said support having a first operative position wherein it locates a pallet carried atop the same immediately below said platform, a cargo scraper on said carrier above said platform rearwardly of said layer of cargo, rollable means for moving said carrier forwardly along said rails relative to said platform whereby said scraper scrapes said layer of cargo off of said platform and onto said pallet, said support having two pairs of crossed legs pivoted thereto, said legs having lower ends mounting rollable means in rolling engagement with said rails, means for spreading apart said lower ends of said legs to lower said support to a second operative position wherein said layer of cargo is disposed on a plane immediately below said platform, means for returning said carrier to said operative location, and means for supplying a second layer of cargo to said platform forwardly of said scraper.

References Cited in the file of this patent

UNITED STATES PATENTS

| | | |
|---|---|---|
| 375,123 | Cheseborough | Dec. 20, 1887 |
| 1,399,528 | Sommers | Dec. 6, 1921 |
| 1,467,019 | Tzibides | Sept. 4, 1923 |
| 1,499,971 | Callison | July 1, 1924 |
| 1,654,706 | Schoen | Jan. 3, 1928 |
| 2,468,055 | Gibler | Apr. 26, 1949 |
| 2,840,223 | Schoppee | June 24, 1958 |
| 2,979,872 | Verrinder | Apr. 18, 1961 |
| 3,017,041 | Hawkes | Jan. 16, 1962 |